Patented Aug. 5, 1941

2,251,496

UNITED STATES PATENT OFFICE 2,251,496

METHOD OF PREPARING CHEESE

Clinton H. Parsons, Chicago, Ill., assignor to Industrial Patents Corporation, Chicago, Ill., a corporation of Delaware No Drawing. Application July 29, 1935, Serial No. 33,659

4 Claims. (Cl. 99—116)

This invention relates to a new process for the preparation of cheese and to the novel product which results from the new process.

One of the objects of the invention is to provide a process for the preparation of pasteurized cheese.

Another object of the invention is to provide a new cheese product of improved flavor, texture and uniformity.

Other objects of the invention will be apparent from the description and claims which follow.

As is well known, the conventional process for producing American or Cheddar cheese involves selection and setting of milk, cutting and cooking the curd therefrom, drawing off the whey, Cheddaring the curd, milling, salting the milled curd, transferring the salted curd into a cheese cloth lined mold, pressing, removing from the press, surface drying, dipping the cheese into hot paraffin and aging.

The cheese is then packed into boxes and allowed to age at the proper temperature which requires a period of about six weeks before any appreciable cheese flavor is developed. Ordinarily six weeks of aging or ripening produces a mild flavored cheese, three months, a medium flavored cheese and six to eight months, a cheese having a flavor termed aged flavor.

The process for manufacturing American or Cheddar cheese is relatively simple and at the same time very exacting. One of the first essentials is good milk. With good milk and exacting technique a uniform product can be produced. One of the important steps in the manufacture of American or Cheddar cheese is the Cheddaring or matting process. The purpose of this operation is three-fold:

1. Moisture control by regulating removal of whey.

2. Development of acidity in the whey running from the curd from about .45 to .6. This acid combines with the calcium paracasinates of the curd converting these compounds into forms containing less calcium.

3. Formation of a characteristic body and texture in the curd.

If too much acid is allowed to develop in the whey retained in the curd, the resulting cheese is the dry and mealy product commonly termed acid cheese which grades as a number two product. Therefore, when the acidity has developed sufficiently to bring about the desired change, the curd is milled and then salted and packed into cloth lined molds. The action of the salt, together with the cooling of the curd to atmospheric temperature, tends to check bacterial action and thus retard further development of acidity.

The art of pasteurizing cheese is well developed and various procedures have been found applicable to the manufacture of pasteurized cheese as exemplified, for example, in such patents as No. 1,323,869 to Kraft, No. 1,400,171 to Kraft, and No. 1,639,828 to Wheeler and Scott, as well as in several patents to Parsons and Richardson, namely, Nos. 1,522,383, 1,522,385, 1,522,386 and 1,774,610.

Pasteurized cheese is prepared from selected proportions of mild flavored cheese, medium flavored cheese and aged flavored cheese. Considerable experience and good judgment is needed to select this cheese so that the finished pasteurized cheese made therefrom will have a fairly firm body, creamy texture, and a fair degree of cheese flavor.

If all aged cheese is used, the pasteurized product will have too much aged flavor for the average consumer. In addition, it will be somewhat expensive due to the relatively higher cost of aged cheese. If the formula consists of all fresh cheese, the pasteurized product therefrom will carry very little cheese flavor and, in addition, it will have a very tough rubbery undesirable body and texture.

Freshly made cheese of the American or Cheddar type is practically devoid of cheese flavor. In addition, it is tough and rubbery. After this cheese is cured at a temperature of 40° to 50°, for a period of six weeks to two months, some cheese flavor is developed and, in addition, the tough rubbery texture gives way to a more or less waxy creamy texture. Fresh cheese to be used in the manufacture of pasteurized cheese should not be selected until the above characteristics are apparent.

An ideal formula for pasteurized cheese should consist of about 25 per cent. fresh cheese, 50 per cent. medium flavored cheese, and about 25 per cent. aged cheese. These products should all be free from flavor defects.

In the manufacture of pasteurized cheese, the bulk cheese is first denuded of its bandage, paraffin and rind. This operation involves a loss in weight of from one per cent. to two per cent. It is then milled and pasteurized by one of a number of well known processes.

I have discovered that the matted or Cheddared curd to which no salt has been added will, if held at a suitable temperature for a sufficient length of time, for example, a temperature of from 50° to 70° Fahrenheit for three to ten days, develop a peculiar creamy condition. This curd may be blended with aged cheese, water, salt, emulsifying salt, and a neutralizing salt in such proportion that a pasteurized cheese will be produced having a very desirable uniform texture, flavor and body. Furthermore, the product so manufactured from a mixture of unsalted curd so treated and aged cheese is practically all of a melting and cooking variety, whereas the ordinary production of pasteurized cheese is most variable in this respect.

In the production of the unsalted curd utilized in the present invention, the matting or Cheddaring process, instead of going on for a period of 40 minutes to an hour, as it does in the manufacture of ordinary American or Cheddar cheese, goes on for days. As a result, a very high degree of acidity is produced, so high, in fact, that if the product were salted and packed in the ordinary commercial Cheddar shapes the resulting product would be extremely acid, short, and mealy in texture and would be an unsatisfactory product.

Accompanying the development of this very high degree of acidity, a new and different texture is produced in the resulting curd which is very creamy and short and can be blended with aged cheese and manufactured into pasteurized cheese having a very desirable flavor, texture, and body.

The acidity formed in the unsalted curd is not only too high for cheese of the American or Cheddar types, it is also very high to be used in the manufacture of pasteurized cheese. I have found that I can successfully neutralize the excess acidity by treating the cheese blend containing the special cured curd with a neutralizing salt. I have found from experiment that the conventional neutralizing salts work fairly well. However, the one I prefer is tri-sodium phosphate. The neutralizing salt is added in such quantity as to adjust the pH of the pasteurized cheese to the desirable acidity of pH 5.4 to 5.6.

This invention has the advantage that no labor or expense is incurred at the country cheese factory in packaging. The usual method employed in the packaging of cheese of the American or Cheddar types involves transferring the milled, salted curd into metal molds previously lined with cheese cloth. The molds are then transferred to a press so that the curd may take shape in a final block of cheese and that the excess whey may be expelled from the curd during the pressing. The following morning the cheese is removed from the metal molds and transferred to the shelves of a curing room. Here the molded product is allowed to stand from one to three days in order that the surface may become thoroughly dry with the resulting formation of some rind. The blocks of cheese are dipped momentarily in a vat of hot paraffin for the purpose of depositing a thin surface layer of paraffin which prevents excessive loss in weight due to moisture evaporation during the curing period. After paraffining the cheese is packed in the conventional wooden cheese box in which it is marketed.

In my process, the matted curd without milling and without salting is placed in barrels or other suitable containers for conveyance from the country cheese factory to the pasteurizing plants, resulting in a very material saving in supplies and labor. In addition to this, there is a further material saving in the use of this curd in the manufacture of pasteurized cheese. It is only necessary to transfer the curd from the barrels to the grinding machines. When cheese of the American or Cheddar types is used it must be first removed from the cheese box, which requires not only expense in the removal, but in disposing of the empty container and then denuded of its bandage, paraffin and rind. The saving in the use of curd is obvious. Because the curd carries no aged flavor to speak of, but a peculiar cured flavor which blends well with the flavor of aged cheese and aged cheese having a fairly uniform flavor can be secured, a finished, manufactured, pasteurized cheese can be produced having a uniform flavor, texture, and body. This result is very difficult if not impossible under conventional conditions of manufacture due to the tremendous variability in the flavor of the bulk cheese used.

In packing, the matted curd may be milled or cut to any desired size and shape. If desired the curd may be packed in barrels, boxes or other similar containers without first matting or Cheddaring, it being sufficient merely to draw off the whey and package the curd. An excess of whey may be removed by a centrifuge, for example. Although I prefer to prepare the curd by the Cheddaring process, this is not essential and any other process may be employed provided that the addition of salt be omitted from the process and the curd be permitted to develop the creamy texture characteristic of curd prepared in accordance with this invention.

As has been noted an ideal formula for pasteurized cheese may consist of fresh cheese, intermediate cheese and aged cheese, each of which are most variable and each of which must be blended for uniformity in the manufacture of pasteurized cheese. In other words, in the regular method there are three variables which are difficult to control whereas in the new method there is only one variable. In the new process it is necessary to blend only aged cheese to obtain uniformity thus simplifying the operation to a very material degree.

In carrying out the process of the present invention, the matted or Cheddared unsalted curd is allowed to cure at a temperature of around 60° for a period of from three to ten days usually about six days. The cured curd will have a creamy consistency and a somewhat acid flavor. There are times when the acidity of this curd may go as low as pH 4.4. The pH of normal fresh cheese of the American and Cheddar type will vary between pH 5.3 and 5.5.

The curd is transferred from the shipping container and blended with a certain amount of aged cheese. In the commercial practice of this invention equal parts of aged cheese and curd may be used. The amount of aged cheese used depends upon its flavor. If the cheese is six or seven months old, carrying a fair degree of aged flavor, about 60 per cent. of aged cheese and 40 per cent. curd may be used. If the aged cheese is a year to a year and a half old, carrying a very high degree of aged flavor, about 40 per cent. of aged cheese and 60 per cent. curd may be used. The blend of aged cheese and curd is milled and then mixed with salt, water and emulsifying salt such as an alkaline citrate, for example, sodium citrate or potassium citrate. In practice, I have found that it is only necessary to use from ½ per cent. to 1 per cent. of emulsifying salt, whereas in the manufacture of ordinary pasteurized cheese up to 3 per cent. is used.

As has been stated, the cured curd is usually very acid. In fact, too acid to be used in the manufacture of pasteurized cheese. It is, therefore, necessary to neutralize some of this acidity. This is done by adding to the mixture sufficient neutralizing salt such as dray tri-sodium phosphate so that the finished pasteurized cheese will have a pH of about 5.4. This cheese is thoroughly mixed and transferred to a kettle where it is heated and stirred until a temperature of about 140° Fahrenheit is obtained. In practice I have found at times that a fluid condition could be reached at a temperature of 135° Fahrenheit and again there have been times when it has been advantageous to pasteurize at a temperature as high as 145° Fahrenheit. I have found in the practice of this discovery that the cheese reaches a fluid condition at a lower temperature than in the case of ordinary pasteurized cheese and that the fluid is less viscous. As a result the product can be readily poured and packaged.

Any convenient method and means may be used for pasteurizing the mixture of specially cured curd and aged cheese to bring about the desirable results. One satisfactory method is to place a charge of ground up specially cured curd and aged cheese into a suitable mixing and heating vessel which is preferably jacketed with steam or hot water and is, of course, provided with stirring means which may be a set of power driven rotary paddles and a cooperating set of stationary or oppositely rotating paddles.

The inner receptacle is preferably equipped with a suitable cover to retain heat and also to prevent undue evaporation of moisture, it being understood that in order to facilitate the practice of the process and to secure proper texture and consistency of the final product a substantial percentage of water may be added to the comminuted cheese during or after application of heat. The charge of comminuted specially cured curd and aged cheese in the receptacle is heated gradually by turning on the steam or circulating hot water which supplies the outer jacket and during the application of heat the stirring devices are operated preferably continuously throughout the duration of the process or until the further application of heat is discontinued.

After the heat has been applied for a certain length of time, for example, for from fifteen to thirty minutes, and the temperature has been raised from the ordinary room temperature to in the neighborhood of 130° to 150° Fahrenheit, the comminuted cheese mass has attained a plastic consistency somewhat like that of thick molasses, and in order to secure cheese of the finest flavor and texture the application of heat should preferably be discontinued when this stage has been reached.

If the heating is continued further, for instance to 160° Fahrenheit or 180° Fahrenheit, the smooth molasses-like consistency may give way to a rubbery-like or heavy dough-like character or the cheese mass may undergo a curdling action in which case the texture becomes short and briny and at times oily. The cool product will be either tough and rubbery or will have a very coarse, brittle texture and an undesirable flavor. It will not possess a texture, body and flavor ordinarily associated with a high-class cheese of this type.

It will, of course, be understood that the handling of the heated material may be made somewhat easier by carrying the heat a little further than I have indicated, thereby securing a somewhat more fluid and more easily handled material. However, from the standpoint of flavor and texture I have found it desirable not to exceed a temperature of 150° Fahrenheit.

After the cheese mass has been heated sufficiently and has reached the desired consistency, the application of further heat is suspended, and the material is then poured into a tin foil lined form or into any other appropriate package.

Another satisfactory method of carrying out the present invention is to subject the mixture of ground or comminuted specially cured curd and aged cheese to the direct action of steam at a temperature sufficient to reduce the cheese to a thick viscous or liquid condition without breaking down the fat globules or causing a separation of the fats and casein.

During this step in the improved process, the cheese may be stirred to prevent unequal heating in different portions of the mass and also to render the mass homogeneous.

By subjecting ground or comminuted cheese to the direct action of steam under condition which allows the steam to uniformly reach all portions of the cheese, it is possible to reduce the cheese to the desired viscous condition almost simultaneously and with uniform heat in all portions of the mass, and it is further possible to reduce the cheese to this viscous condition within an exceedingly short period of time.

A temperature of about 145° Fahrenheit is usually sufficient to reduce the cheese to the viscous or semi-liquid form above described. Light cheeses require less temperature for their reduction, and increased temperatures are required for the heavier or more solid cheeses. The desired temperature in each case can be readily obtained by observation of the product, whereby it can readily be determined whether the cheese is sufficiently liquid to allow it to be mixed, or handled in a mixer, or poured into a receptacle or package under comparatively light pressure, slowly without pressure and more rapidly under light pressure.

After the cheese has been reduced to a liquid or viscous form, as above described and while still warm and viscous or plastic, it is packed in suitable containers, such, for example, as paper packages or wooden boxes, or any other suitable receptacles adapted to contain a definite quantity or weight of cheese in merchantable packages of commercially popular size.

Another satisfactory process for pasteurizing the mixture of specially cured curd and aged cheese is to force the blended material rapidly and continuously through a pasteurizing chamber and into contact with a series of heating tubes through which hot water is circulated at a temperature of about 150° to 170° Fahrenheit, the flow of the cheese being regulated so that its temperature is raised to about 145° Fahrenheit, and the cheese being subjected to contact with the heating tubes for only a short period of time.

I have found that the product may be satisfactorily prepared by first emulsifying the cheese and special curd at a relatively low temperature and then forcing the emulsified cheese rapidly and continuously through a pasteurizing chamber and into contact with heat radiating elements such as a series of heating tubes through which hot water is circulated at a temperature of about 160° to 170°. Into this chamber is being discharged steam. The flow of cheese and of steam is so regulated that its temperature is raised to about 140° to 145° Fahrenheit. The cheese, during its passage through this chamber of tubes, is subjected to contact with the heating tubes and with the live steam for only a short period of time. It will be seen that by a process of this kind that the production rate of the cheese will vary in proportion to the amount of steam which is ejected into the pasteurizing chamber containing the tubes. However, the element which controls this rate of production is the moisture in the finished product which must not be over 40 per cent. Therefore, if too much steam is used, the water condensed by virtue of this steam will cause the cheese to be too high in moisture. Therefore, the amount of steam which we can use will be controlled by the moisture contained in the aged cheese and in the curd. Generally speaking, about half of the heating will be done by steam and the other half by contact with the heated tubes.

I have found that the product may be satisfactorily prepared by first emulsifying the cheese and special curd at a relatively low temperature, preferably between 95° Fahrenheit and 105° Fahrenheit and then subjecting the emulsified cheese to a pasteurizing or sterilizing temperature, for example, a temperature which will heat the emulsified cheese to a temperature of about 145° Fahrenheit. The combined emulsification and sterilization may be advantageously carried out as a continuous process with the emulsifying apparatus operating as a forcing means for emulsifying the cheese and forcing the emulsified cheese continuously through the pasteurizer or sterilizer.

It will be seen that irrespective of the manner in which emulsification or pasteurization or both are effected, that the present invention relates to an improved process for preparing a pasteurized or process cheese of unusual and distinctive flavor and having very desirable properties.

In its broadest aspect the present invention involves a novel method of preparing cured curd differing from the conventional production of curd for the manufacture of Cheddar cheese in the omission of salt and the development of creamy texture by holding matted or Cheddared curd to which no salt has been added at a suitable temperature until the desired texture and flavor is developed. At a temperature of from 50° Fahrenheit to 60° Fahrenheit a desirable flavor and texture is developed in approximately three to ten days.

The use of this specially cured curd in the manufacture of pasteurized cheese eliminates the waste of rind, paraffin and bandage and permits the use of a large percentage of curd as a substitute for cheese, resulting in a pasteurized cheese product which is actually superior in flavor and texture to pasteurized cheese manufactured from bulk cheese.

It will be understood that in the manufacture of pasteurized cheese in accordance with this invention the cured unsalted Cheddared curd may be neutralized by mixing the neutralizer therewith either before or after the curd has been mixed with aged cheese. It will also be understood that the term "cured" as applied to curd indicates the condition of creamy texture which has been described. The term "cured" as applied to cheese is used in the usual sense. The term "neutralized" is used in the claims in the sense of the pH of Cheddar cheese or pasteurized cheese.

I claim:

1. The method of treating curd which comprises subjecting matted or Cheddared curd to which no salt has been added to a temperature of from 50° Fahrenheit to 60° Fahrenheit until a creamy texture is developed.

2. The method of treating curd which comprises subjecting matted or Cheddared curd to which no salt has been added to a temperature of from 50° Fahrenheit to 60° Fahrenheit for three to ten days.

3. The method of preparing a pasteurized cheese product which comprises subjecting matted or Cheddared curd to which no salt has been added to a temperature of from 50° Fahrenheit to 60° Fahrenheit until a creamy mixture is developed in the curd, admixing the curd with cheese and thereafter pasteurizing the mixture.

4. The method of preparing a pasteurized cheese product which comprises subjecting matted or Cheddared curd to which no salt has been added to a temperature of from 50° Fahrenheit to 60° Fahrenheit for three to ten days, admixing the curd with cheese and thereafter pasteurizing the mixture.

CLINTON H. PARSONS.